(12) United States Patent
Viviani et al.

(10) Patent No.: US 8,857,364 B2
(45) Date of Patent: *Oct. 14, 2014

(54) WAKESURFING BOAT AND HULL FOR A WAKESURFING BOAT

(71) Applicant: 3MADMEN, Monaco (MC)

(72) Inventors: Albert Viviani, Monaco (MC); Arye Laniado, Monaco (MC); Joshua Laniado, Monaco (MC); Yann Le Jeune, Villefranche sur Mer (FR); Pietro Lagioia, Vari (IT)

(73) Assignee: 3MADMEN (MC)

( * ) Notice: Subject to any disclaimer, the term of this patent is extended or adjusted under 35 U.S.C. 154(b) by 0 days.

This patent is subject to a terminal disclaimer.

(21) Appl. No.: 14/060,907

(22) Filed: Oct. 23, 2013

(65) Prior Publication Data

US 2014/0083346 A1    Mar. 27, 2014

Related U.S. Application Data

(63) Continuation of application No. 13/835,660, filed on Mar. 15, 2013, now Pat. No. 8,590,475, which is a continuation-in-part of application No. 13/315,696, filed on Dec. 9, 2011.

(51) Int. Cl.
*B63B 1/32* (2006.01)
*B63B 1/06* (2006.01)
*B63B 1/04* (2006.01)
*B63B 43/06* (2006.01)
*B63B 1/20* (2006.01)

(52) U.S. Cl.
CPC ... *B63B 1/04* (2013.01); *B63B 1/06* (2013.01); *B63B 43/06* (2013.01); *B63B 1/20* (2013.01)
USPC .......................................................... 114/288

(58) Field of Classification Search
USPC .......................................................... 114/288
See application file for complete search history.

(56) References Cited

U.S. PATENT DOCUMENTS

| 1,204,355 A | 11/1916 | Hickman |
| 1,316,762 A | 9/1919 | Bigelow |

(Continued)

FOREIGN PATENT DOCUMENTS

| EP | 0466382 | 1/1992 |
| EP | 1075415 B1 | 2/2001 |
| JP | 1-95991 | 4/1989 |

OTHER PUBLICATIONS

European Search Report for Application No. 12196282.3-1754; Mar. 27, 2013; 8 pages.

*Primary Examiner* — Lars A Olson
*Assistant Examiner* — Jovon Hayes
(74) *Attorney, Agent, or Firm* — Martin & Ferraro, LLP

(57) ABSTRACT

A wakesurfing boat and a hull for a wakesurfing boat. The hull includes a bottom having a preselected length extending from a bow to a stern. The bottom includes a central ridge and port and starboard ridges extending below respective port and starboard bulwarks to define a substantially M-shaped bottom with concave portions to port and starboard of the central ridge. Port and starboard sponsons extend below the port and starboard bulwarks proximate the stern. A trim wedge projects below the stern. Two rounded stern portions are provided proximate the stern. In a dynamic surfing mode, with selectively-fillable ballast tanks partially or fully flooded, water flowing through the port and starboard concave portions, combined with the ballast, increases resistance to the hull, resulting in a larger wake wave. Water passing around the structural features proximate the stern is directed toward a convergent zone in the wake, resulting in an improved wake wave shape.

28 Claims, 11 Drawing Sheets

(56) References Cited

U.S. PATENT DOCUMENTS

| | | |
|---|---|---|
| 1,620,349 A | 3/1927 | Hickman |
| 1,644,725 A | 10/1927 | Hickman |
| 1,670,623 A | 5/1928 | Hickman |
| 1,681,342 A | 8/1928 | Hickman |
| 2,285,959 A | 6/1942 | Dubay |
| 2,515,005 A | 7/1950 | Hickman |
| 3,191,572 A | 6/1965 | Allen |
| 3,200,782 A | 8/1965 | Walden et al. |
| 3,330,239 A | 7/1967 | Dornak |
| 3,503,358 A | 3/1970 | Moesly |
| 3,675,605 A | 7/1972 | Knerr |
| 3,709,179 A | 1/1973 | Payne |
| 3,797,437 A | 3/1974 | Cowles |
| 3,800,725 A | 4/1974 | L'Heureux |
| 4,478,166 A | 10/1984 | Sorensen |
| D301,573 S | 6/1989 | Fuller |
| 5,231,949 A | 8/1993 | Hadley |
| 5,351,641 A | 10/1994 | Robson |
| 5,427,048 A | 6/1995 | Takeuchi |
| 5,458,078 A | 10/1995 | Perette |
| 5,474,014 A | 12/1995 | Russell |
| 5,526,762 A | 6/1996 | Kiley |
| 5,549,071 A | 8/1996 | Pigeon et al. |
| D382,850 S | 8/1997 | Schmidt |
| 5,655,473 A | 8/1997 | Arvilla |
| 5,664,910 A | 9/1997 | Lochtefeld et al. |
| 5,718,184 A | 2/1998 | Holland |
| D400,156 S | 10/1998 | Duvenage et al. |
| 5,860,384 A | 1/1999 | Castillo |
| 5,860,766 A | 1/1999 | Lochtefeld et al. |
| D405,411 S | 2/1999 | Schmidt |
| 6,044,708 A | 4/2000 | Hirosawa |
| 6,047,657 A | 4/2000 | Cox |
| 6,105,527 A | 8/2000 | Lochtefeld et al. |
| 6,192,819 B1 | 2/2001 | Larson et al. |
| 6,250,245 B1 | 6/2001 | Robinson et al. |
| 6,293,216 B1 | 9/2001 | Barsumian |
| 6,314,903 B2 | 11/2001 | Robinson et al. |
| 6,374,762 B1 | 4/2002 | Larson et al. |
| 6,526,903 B2 | 3/2003 | Robinson et al. |
| 6,604,478 B2 | 8/2003 | Barsumian |
| 6,868,798 B2 | 3/2005 | Robinson et al. |
| 6,941,884 B2 | 9/2005 | Moore |
| 6,983,713 B1 | 1/2006 | Robinson et al. |
| 7,063,031 B2 | 6/2006 | Earl, Jr. et al. |
| 7,093,553 B2 | 8/2006 | Robinson et al. |
| 7,252,047 B1 | 8/2007 | Baucom, Jr. |
| 7,305,926 B2 | 12/2007 | Seider |
| D570,278 S | 6/2008 | Horais |
| 7,418,915 B2 | 9/2008 | Campbell |
| 7,458,332 B2 | 12/2008 | Wilson et al. |
| D595,204 S | 6/2009 | Robinson et al. |
| 7,578,250 B2 | 8/2009 | Baker |
| 7,625,153 B2 | 12/2009 | Sauerbier |
| 7,677,190 B2 | 3/2010 | Miller |
| 7,699,016 B2 | 4/2010 | Larson et al. |
| D643,357 S | 8/2011 | Moore et al. |
| D651,551 S | 1/2012 | Moore et al. |
| 8,590,475 B2 * | 11/2013 | Viviani et al. ............... 114/288 |
| 2003/0041791 A1 | 3/2003 | Chollet et al. |
| 2009/0308300 A1 | 12/2009 | Baker |
| 2010/0275829 A1 | 11/2010 | Sporsheim |
| 2011/0017115 A1 | 1/2011 | Olofsson |
| 2013/0145978 A1 | 6/2013 | Viviani |
| 2013/0220193 A1 | 8/2013 | Viviani et al. |

\* cited by examiner

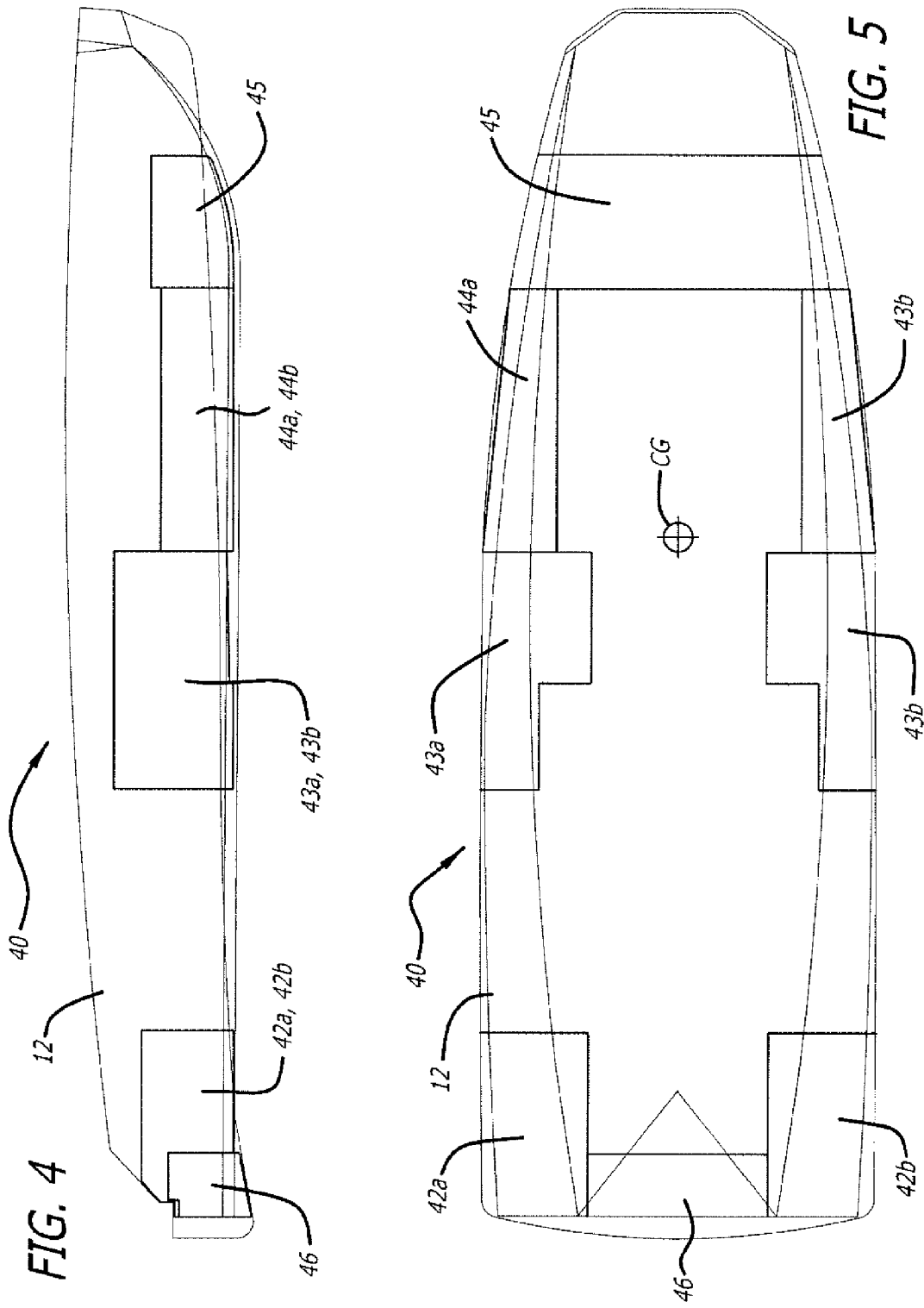

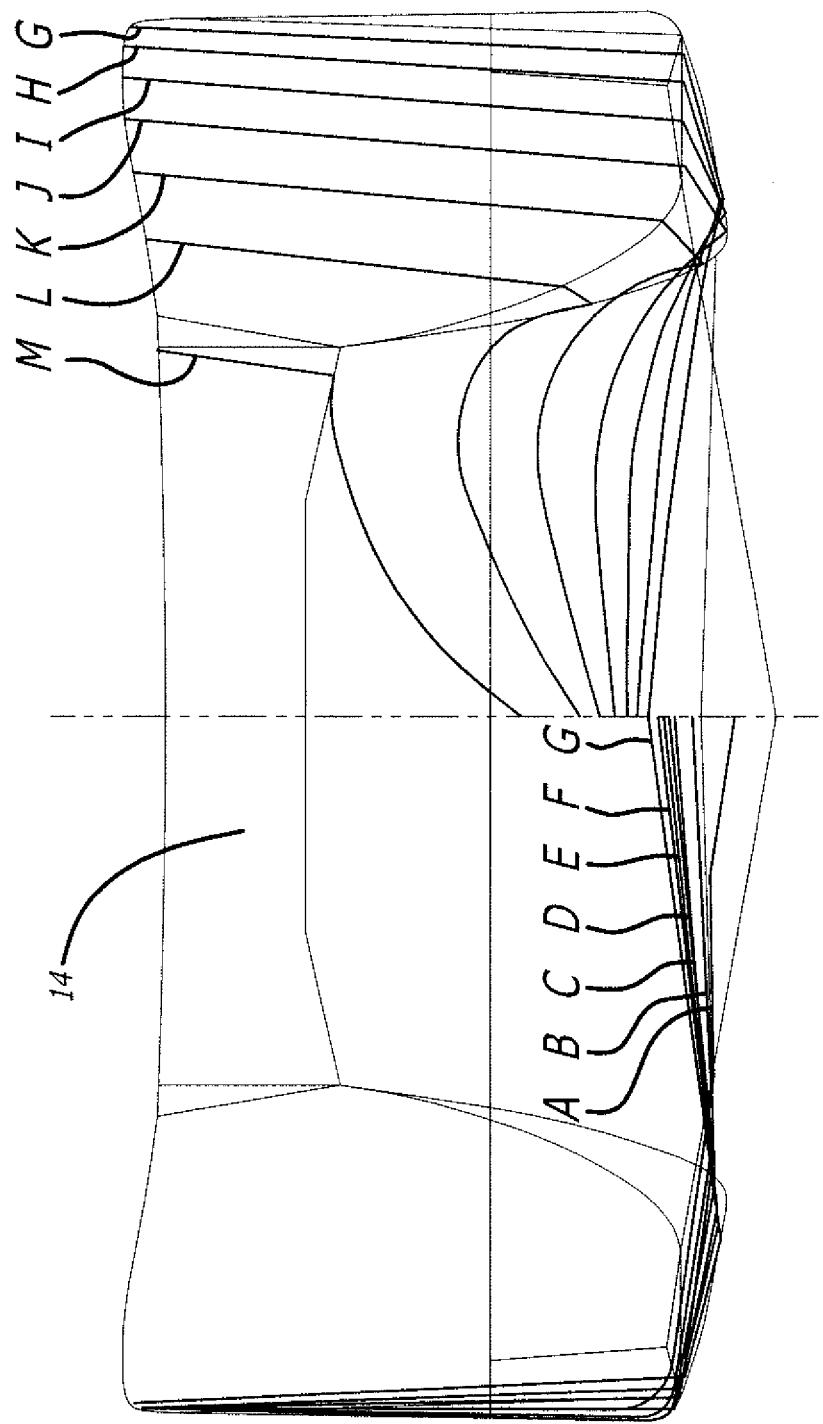

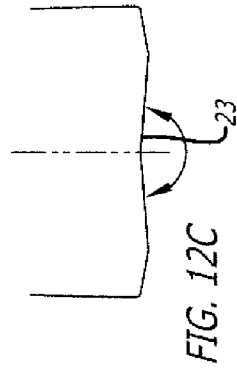
FIG. 12A
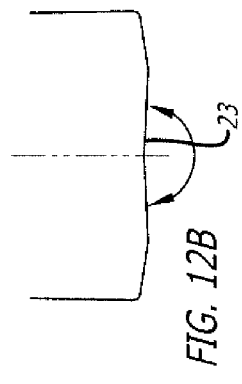
FIG. 12B
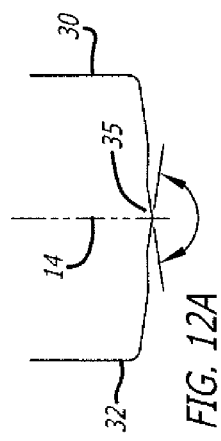
FIG. 12C
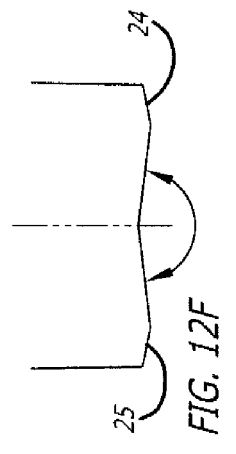
FIG. 12D
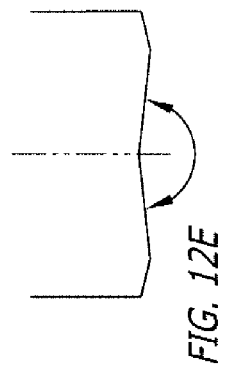
FIG. 12E
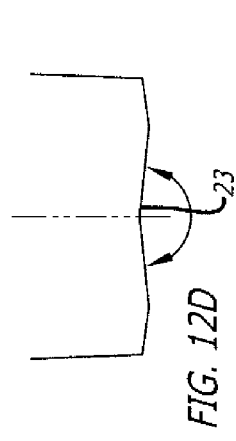
FIG. 12F
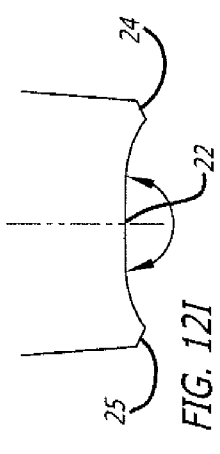
FIG. 12G
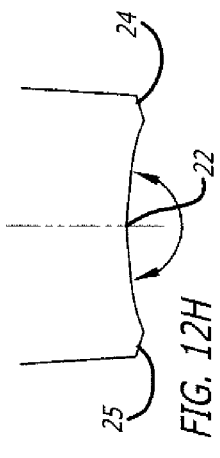
FIG. 12H
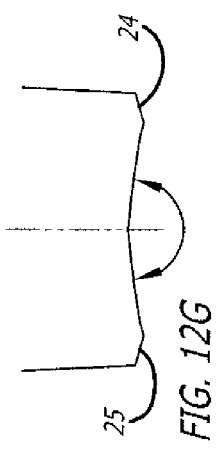
FIG. 12I
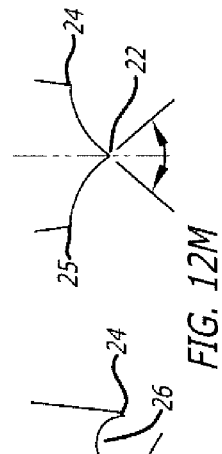
FIG. 12J
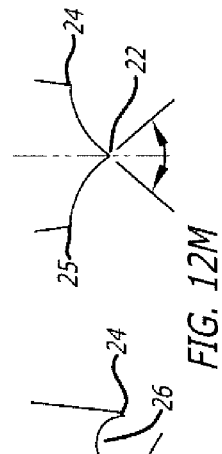
FIG. 12K
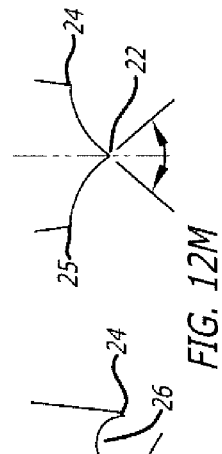
FIG. 12L
FIG. 12M

| Draft | Displ. | L/B | Lwl | Bwl | Volume |
|---|---|---|---|---|---|
| m | tonnes | ratio | m | m | m3 |
| 0,42 | 15,585 | 2,66 | 12,067 | 4,541 | 15,205 |
| 0,44 | 16,532 | 2,69 | 12,233 | 4,540 | 16,129 |
| 0,46 | 17,487 | 2,74 | 12,419 | 4,539 | 17,060 |
| 0,48 | 18,449 | 2,77 | 12,582 | 4,538 | 17,999 |
| 0,50 | 19,418 | 2,80 | 12,702 | 4,538 | 18,944 |
| 0,52 | 20,393 | 2,82 | 12,798 | 4,537 | 19,895 |
| 0,54 | 21,374 | 2,83 | 12,855 | 4,536 | 20,853 |
| 0,56 | 22,361 | 2,85 | 12,912 | 4,535 | 21,816 |
| 0,58 | 23,354 | 2,86 | 12,952 | 4,534 | 22,784 |
| 0,60 | 24,351 | 2,86 | 12,978 | 4,533 | 23,757 |
| 0,62 | 25,354 | 2,87 | 13,004 | 4,532 | 24,736 |
| 0,64 | 26,362 | 2,88 | 13,031 | 4,531 | 25,719 |
| 0,66 | 27,374 | 2,88 | 13,050 | 4,530 | 26,706 |
| 0,68 | 28,390 | 2,88 | 13,059 | 4,529 | 27,698 |
| 0,70 | 29,411 | 2,89 | 13,068 | 4,528 | 28,693 |
| 0,72 | 30,435 | 2,89 | 13,078 | 4,527 | 29,693 |
| 0,74 | 31,463 | 2,89 | 13,087 | 4,526 | 30,696 |

WAKESURFING BOAT AND HULL FOR A WAKESURFING BOAT

DESCRIPTION OF THE INVENTION

The present application is a continuation of U.S. application Ser. No. 13/835,660, filed Mar. 15, 2013, which is a continuation-in-part of U.S. application Ser. No. 13/315,696, filed Dec. 9, 2011, the contents of which are incorporated herein by reference, and claims priority thereto under 35 U.S.C. 120.

FIELD OF THE INVENTION

The present invention relates to boats and boat hulls. More particularly, the present invention relates to wakesurfing boats, and hulls used for wakesurfing boats.

BACKGROUND OF THE INVENTION

Wakesurfing is a sport that is growing in popularity. A wakesurfer, initially being towed behind a boat via a tow rope, rises to his feet on a surf board in a body of water (e.g., an ocean, a sea, a lake, or a river) similar to a waterskier or a wakeboarder. In order to achieve an ideal wakesurfing ride, the boat should generate in its wake a wave that mimics as closely as possible, in view of the type of body of water, a size, a shape, a power, and a duration, of an ocean wave rising, cresting, and breaking near a beach, enabling the surfer to traverse back and forth on a face of the wake wave and ride a crest of the wake wave, similar to an ocean surfer.

Wakesurfers have been attempting to surf in the wakes of traditional cruising boats, waterskiing boats, and wakeboarding boats. These traditional classes of boats typically are designed for one or more of speed, seaworthiness, and handling characteristics. A problem with attempting to wakesurf behind traditional cruising boats, waterskiing boats, and wakeboarding boats, however, is that such boats fail to generate sufficiently large, sufficiently well-shaped, and sufficiently long-lasting wake waves to give a wakesurfer a long satisfying ride.

As is well known in the field of fluid dynamics, a boat, when passing through a body of water, creates separate waves that move in the boat's wake. In general, separate wake waves originate, respectively, from the boat's bow, centerline, quarter, and stern. Each wake wave generally forms the arms of a V, with the source of the respective wake wave being at the point of the V (the boat), and transverse curled wave crests forming offset from the path of the boat. Wake wave height (Wh) is a function of several factors, including for example a speed of the boat hull in the body of water, resistance to the boat hull as it moves through the body of water, Froude number, a shape of the hull, a length of the hull, a length/beam ratio (L/B) of the hull, a speed/length ratio (SLR) of the hull, an amount of the boat hull in contact with the body of water, and an amount of water displaced by the boat as it moves through the body of water. Traditional cruising boats, wakeboarding boats, and waterskiing boats typically are configured are configured with planning hulls, have an L/B greater than 3.0, have light displacements, experience minimal water resistance when moving through the water, and have optimal seaworthiness and handling characteristics.

Wake wave shape (Ws) can be affected by several factors, including length of the waterline (LWL), air trapped beneath the hull, water flowing under the hull, and water flowing past the bulwarks of the hull. For example, air can be trapped beneath the hull by being admitted below a raised bow of a traditional boat. This air, exiting at the stern of the hull, creates turbulence in the wake, giving the wake wave an undesirable muddy appearance. Water flowing under the hull and past the bulwarks of a traditional boat typically is directed away from the wake, resulting in a wave shape Ws with an undesirable wave aspect, slope, and/or power.

A self-propelled wakesurfing boat, and a hull for a wakesurfing boat, is desired which will generate the largest, best-shaped, and longest-lasting wake waves possible in view of the boat's size, displacement, and speed.

SUMMARY OF THE INVENTION

In accordance with the invention, a wakesurfing boat, and a hull for a wakesurfing boat, for wakesurfing in a body of water, substantially obviates one or more of the problems caused by the limitations and disadvantages of traditional boats.

A wakesurfing boat operable in a body of water, in accordance with the invention, includes a hull. The hull includes a bow, a stern, port and starboard bulwarks, a bottom, a length, a beam, and a first waterline when the hull is at rest. A substantially central ridge extends a first depth below the hull bottom proximate the bow, extending along the length at progressively decreasing depths below the bottom to a substantially planar bottom portion midway between the bow and the stern. Port and starboard ridges extend second depths beneath the bottom proximate respective port and starboard bulwarks, defining with the central ridge a generally M-shaped cross section with port and starboard concave portions opening beneath the bow, the port and starboard ridges extending along the length at progressively decreasing depths below the bottom to the substantially planar bottom portion;

Port and starboard lateral rounded sponsons extend beneath the respective port and starboard bulwarks proximate the stern. Preferably each sponson is rounded with an approximately 150 mm fillet.

A trim wedge extends from the hull below the stern, and extends forward, defining two generally triangular faces, toward the substantially planar portion;

A first rounded stern portion is provided below the stern, immediately aft of, and attached to, the trim wedge. A second rounded stern portion is defined by the stern extending from the port sponson to the starboard sponson.

A ballast system is supported by the hull, including a plurality of ballast tanks and a ballast watering system. The ballast tanks are configured and positioned within the hull to selectively receive ballast water and trim the hull, while the hull is moving through the water, in one of at least two operating modes, including a non-surfing, or cruising, mode, and a dynamic surfing mode. A static surfing mode exists, wherein the ballast tanks are being flooded, but the hull is not moving through the water, prior to the dynamic surfing mode.

In the cruising mode, with the ballast tanks substantially empty, the hull has a first trim angle, bow up, and a second waterline, higher on the bulwarks than the first waterline. A first amount of displaced water is displaced by the hull. A first amount of water enters the openings at the bow to the port and starboard concave portions of the generally M-shaped bottom, and flows under the bottom of the hull. The above features combine to give the hull a first LWL1, and subject the hull to a first amount of water resistance. In the wake of the hull, a first wake wave W1 is generated, having a first height Wh1, and a first shape Ws1.

In the dynamic surfing mode, with ballast tanks at least partially filled, or filled with ballast water, the hull has a second trim angle, stern down, and a third waterline higher on the bulwarks than the second waterline. A second amount of displaced water is displaced by the hull, greater than the first amount of displaced water. A second amount of water, greater than the first amount of water, enters the openings at the bow of the concave portions of the generally M-shaped bottom, and flows under the hull. The above features combine to give the hull a second LWL, LWL2, greater than LWL1, and further subject the hull to a second amount of water resistance, greater than the first amount of water resistance. In the wake of the hull, a second wake wave W2 is generated, having a second wave height Wh2, and a second wave shape Ws2.

The combination of increased ballast, increased LWL with more of the hull bottom in contact with the water, increased volume of water passing through the concave portions of the generally M-shaped bottom, and the resultant increase in water resistance to the hull results in the hull, in the dynamic surfing mode, generating a wake wave W2 having a greater height Wh2 than the wake wave W1 generated by the hull in the cruising mode, and greater in height than wake waves generated by traditional boat hulls.

In order to decrease an amount of air under the hull, with its resultant loss of pressure, which produces the generally muddy-appearing water in the hull's wake, the deep concave portions have been defined in the hull bottom, and LWL has been increased to achieve improved performance and an increase in the wetted surface of the hull. The configuration of the concave portions proximate the bow suppresses a flow of air under the hull, resulting in a reduced loss of pressure under the hull.

The combination of water passing around the rounded lateral sponsons, water passing beneath the first rounded stern portion, water passing by the second rounded stern portion, and water passing by the surfaces of the trim wedge, directs water to a convergent zone in the wake of the moving hull, generating the wake wave W2 with a wave shape Ws2 having an improved slope and power in comparison to a wake wave shape Ws1 generated by the hull in the cruising mode, and having a better shape than wake waves generated by traditional hulls.

In addition, the wave created by the hull passing, rather than planning, in the water is due to a reinstatement of atmospheric pressure (1 bar at sea level) following a disturbance in the water created by passage of the hull therethrough, wherein surface water is pushed downward, increasing pressure in the water, with atmospheric pressure following immediately after passage of the hull, which typically creates pressure fluctuations, resulting in an unsatisfactory wave shape. As discussed above, the combined hull features of the present invention act together to increase the hull's wetted surface and its displacement, resulting in a higher water resistance thereto as it moves through the water in the dynamic surfing mode, generating a larger wake wave, while the structural hull features at the bow, i.e., the concave portions, both suppress entry of air beneath the hull, and act as a funnel, carrying water back to where the trim wedge and the rounded stern features to direct water into a convergent zone in the wake, to generate the wake wave with a desired shape, in terms of aspect, slope, and power.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate the presently preferred embodiment of the invention and together with the description, serve to explain the principles of the invention.

BRIEF DESCRIPTION OF THE DRAWINGS

FIG. 4 is a side cross-sectional view of the hull in accordance with the invention, depicting locations of the ballast tanks;

FIG. 5 is a top cross-sectional view of the hull in accordance with the invention, depicting locations of the ballast tanks;

FIG. 11 is a front cross-sectional view of the hull, in accordance with the invention, depicting the relative locations of each of the cross-sectional cuts A-M, shown in FIGS. 9 and 10;

FIGS. 12A-12M are cross-sectional views of the hull, in accordance with the invention, at each of the respective cross-sectional cuts A-M, as shown in FIGS. 9 and 10;

1-16, and depicts generation of a resultant wake wave having a desired height, aspect, slope, and power.

DESCRIPTION OF THE PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

Figure 1:
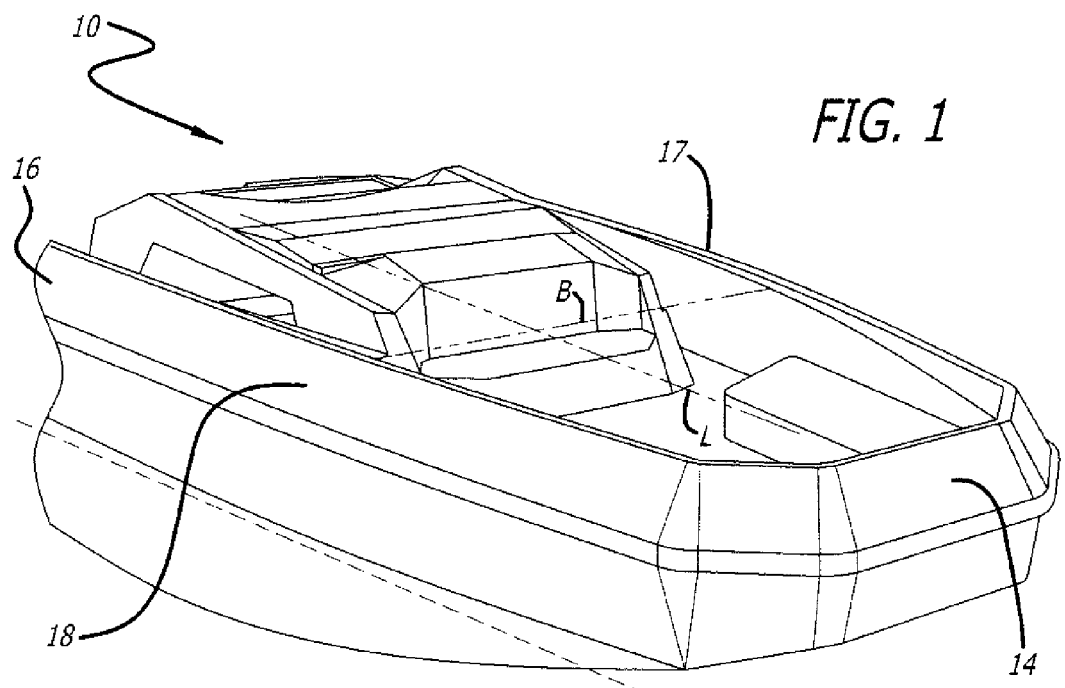
FIG. 1 is a front perspective view of a wakesurfing boat in accordance with the present invention.

In accordance with the invention, as broadly embodied in FIG. 1, a wakesurfing boat 10 includes a hull 12. Hull 12 includes a bow 14, a stern 16, a port bulwark 17, a starboard bulwark 18, a center of gravity CG, a first waterline WL1 defined on the bulwarks when the boat is at rest in a body of water, a hull bottom 20, a length L, a beam B, and preferably a length to beam ratio L/B of less than 3.0.

Figure 2:
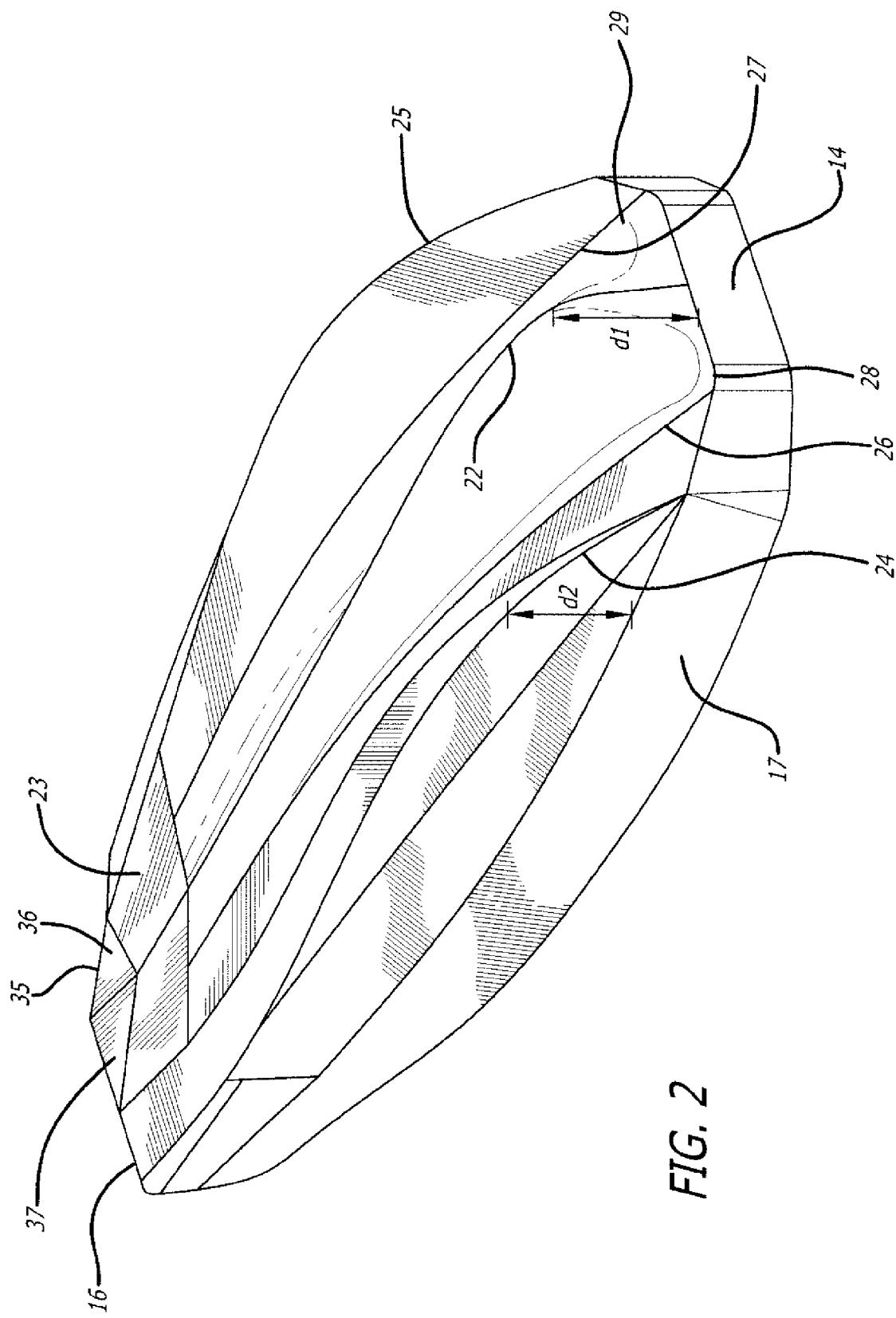
FIG. 2 is a front perspective view of a bottom of a hull in accordance with the present invention.
Figure 16:
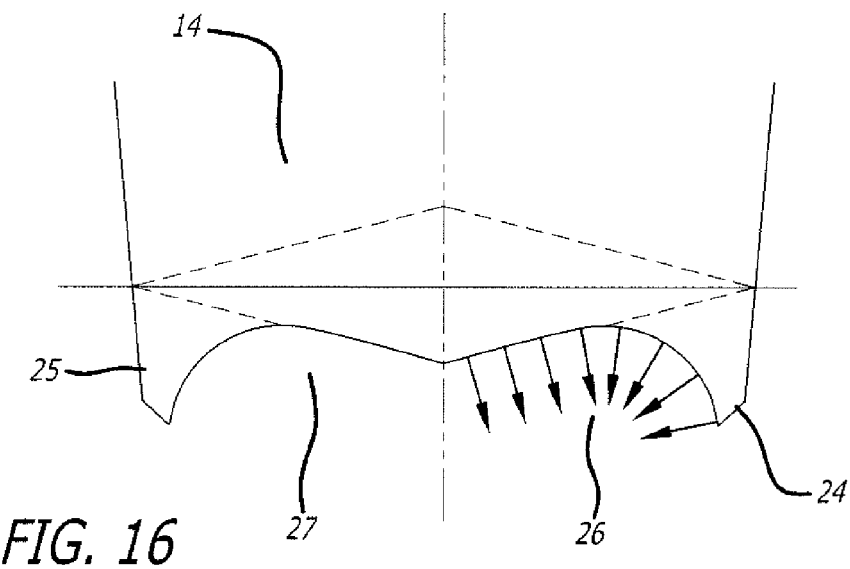
FIG. 16 depicts the generally M-shaped hull, in accordance with the invention, port and starboard concave portions of the hull in accordance with the invention, and more particularly how the port and starboard concave portions at the cross-sectional view depicted proximate FIG. 12K and FIG. 12L assist in suppressing air flow beneath the bow and maintaining pressure under the hull, thereby suppressing trapped air under the hull in accordance with the invention.

As broadly embodied in FIGS. 2 and 3, hull bottom 20 includes a substantially central ridge portion 22 extending a first depth d1 below the hull proximate the bow 14. Preferably, and as shown in FIG. 2, the depth of the central ridge portion 22 extends along the length of the hull bottom 20 at progressively decreasing depths to a substantially planar portion 23 in the hull bottom 20 midway between the bow 14 and the stern 16. A port ridge portion 24 and a starboard ridge portion 25 each extend a second depth d2 below the hull proximate the respective port and starboard bulwarks 17 and 18. In accordance with the invention, and as best embodied in FIGS. 2 and 16, the central ridge portion 22, and the port and starboard ridge portions 24 and 25, combine to define a substantially M-shaped cross-sectional configuration, with port and starboard concave portions 26 and 27, defined between the substantially central ridge 22, and the respective port and starboard ridges 24 and 25. The port concave portion 26 is open to the body of water at an opening 28 proximate the bow 14, and the starboard concave portion 27 is open to the body of water at an opening 29, also proximate the bow 14. Preferably, and as shown in FIG. 2, the respective depths of the port and starboard ridge portions 24 and 25 extend along the length of the hull bottom 20 at progressively decreasing depths below the hull bottom to the substantially planar portion 23.

Figure 3:
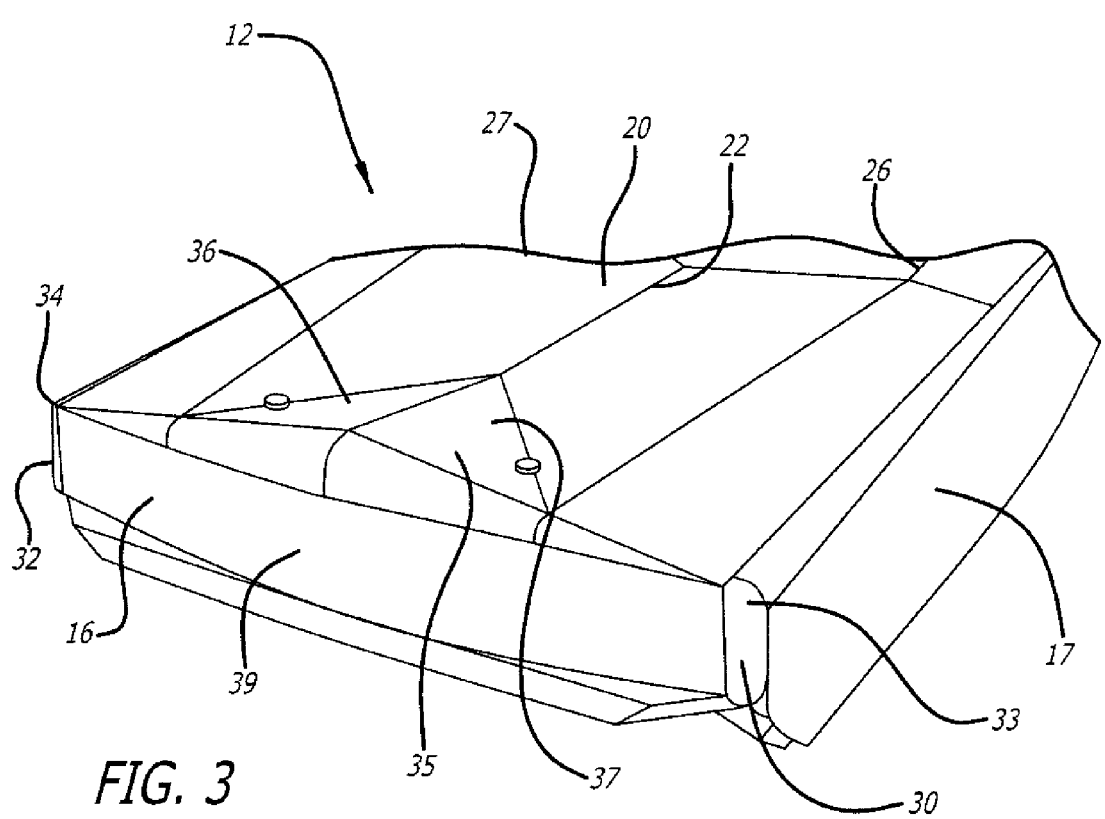
FIG. 3 is a rear perspective view of the bottom of the hull depicted in FIG. 2.
Figure 14:
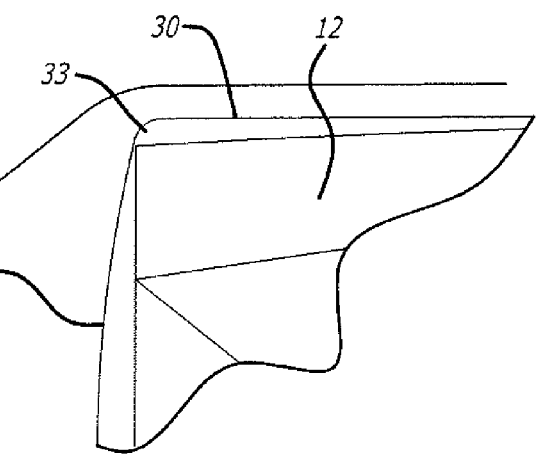
FIG. 14 depicts a laterally-rounded sponson, in accordance with the invention, and depicts how water flowing past the rounded sponson, is directed by the sponson into the hull's wake.

In accordance with the invention, and as broadly embodied in FIGS. 3 and 14, port and starboard lateral rounded sponsons 30 and 32 extend beneath the respective port and starboard bulwarks 17 and 18 proximate the stern 16. Preferably, each sponson is rounded with a lateral fillet 33 and 34 respectively. Each fillet preferably has a radius of approximately 150 mm. Referring to FIG. 1, the port and starboard lateral sponsons also are raised higher on the bulwarks 17 and 18, respectively.

In accordance with the invention, a trim wedge 35 extends below the stern 16 to a third depth d3. As broadly embodied in FIGS. 2 and 3, the trim wedge 35 extends forward toward the substantially planar portion 23, defining first and second generally triangular faces 36 and 37.

Figure 13:
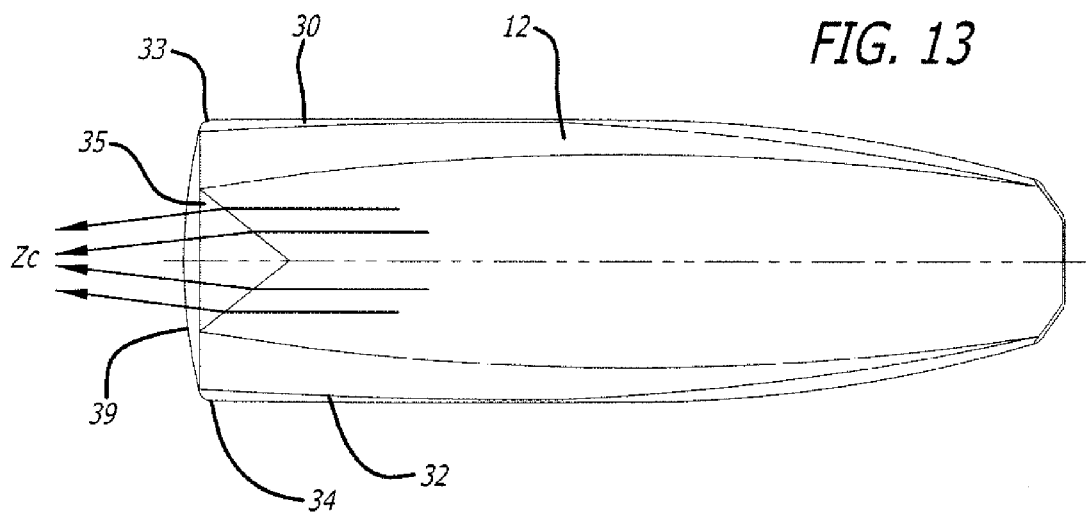
FIG. 13 depicts a trim wedge at the stern of the hull, in accordance with the invention, and depicts how water flowing under the hull, is directed by the stern wedge into the hull's wake.
Figure 15:
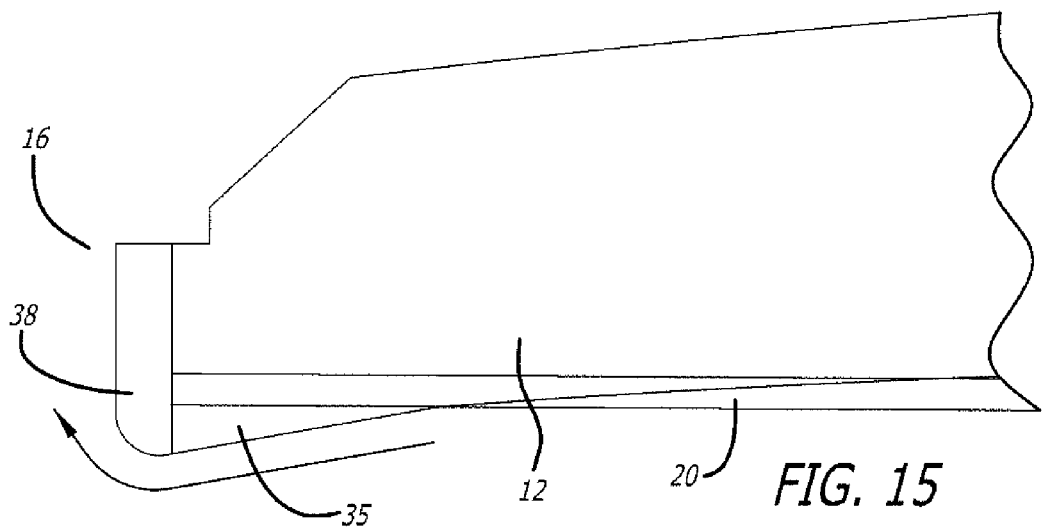
FIG. 15 depicts a first rounded stern portion, in accordance with the invention, and depicts how water flowing under the hull and past the first rounded portion, is directed by the first rounded stern portion into the hull's wake.

In accordance with the invention, and as broadly embodied in FIG. 15, the hull further comprises a first generally rounded stern portion 38 located below the stern 16, immediately aft of, and attached to, the trim wedge 35. It is further preferred, referring to FIGS. 3, 13, and 17, that a second rounded portion 39 be provided at the stern 16, extending from the port sponson 30 to the starboard sponson 32.

In accordance with the invention, a ballast system 40 is supported by the hull 12. As broadly embodied in FIGS. 4 and 5, ballast system 40 includes a plurality of ballast tanks, including sets of dual tanks, and single tanks 42a, 42b, 43a, 43b 44a, 44b, 45, and 46. Preferably, a ballast watering system including at least one pump (not shown) is provided to selectively pump ballast water to various selected ballast tanks in order to trim the hull 12 in various selected trim angles during different operating modes, as explained in detail below. Preferably, the ballast tanks are configured with a preselected volume capacity, and positioned on the hull 12, in order to obtain desired conditions of waterline, LWL, displacement, and trim angle, when the hull 12 is moving through the body of water. For example, dual tanks 44a, 44b are positioned partly forward of the CG, tank 45 is positioned forward of tanks 44a, 44b. Tank 46, positioned at the stern, has the largest capacity, greater than approximately 1100 liters of ballast water.

Figures 19, 20:
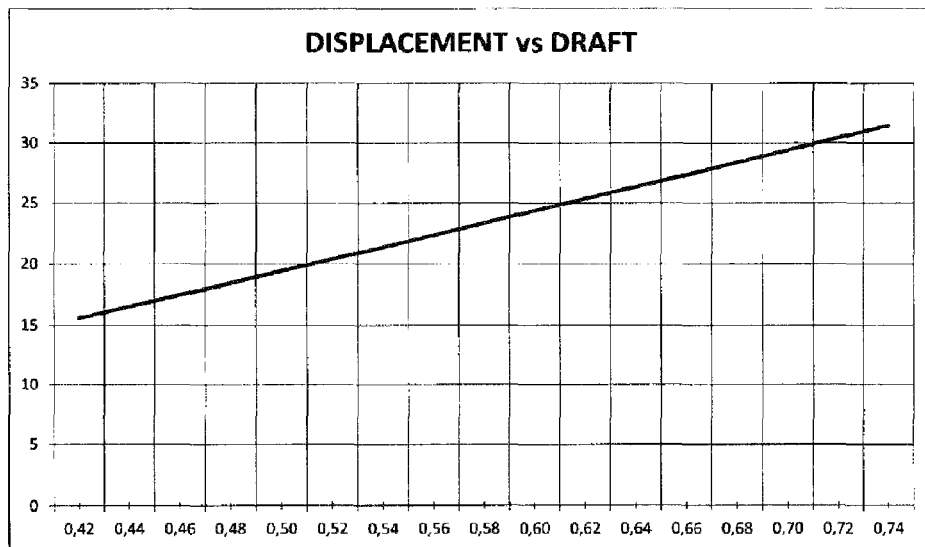
FIG. 19 is a chart depicting for a hull having the configuration in accordance with the invention, immersed in salt water, for various drafts, displacements, L/B ratio, Lwl, Bwl, and volume
FIG. 20 is a graph depicting for a hull having the configuration in accordance with the invention, immersed in salt water, displacement vs. draft.

As a result of the ballasting, it is further preferred that the volumes of the hull when immersed in salt water, L/B ratios, LWL, and associated hull displacements and drafts, be established as shown in FIGS. 19 and 20. One of ordinary skill will recognize that the hull volumes will change when the hull is immersed in fresh water.

Figure 9:
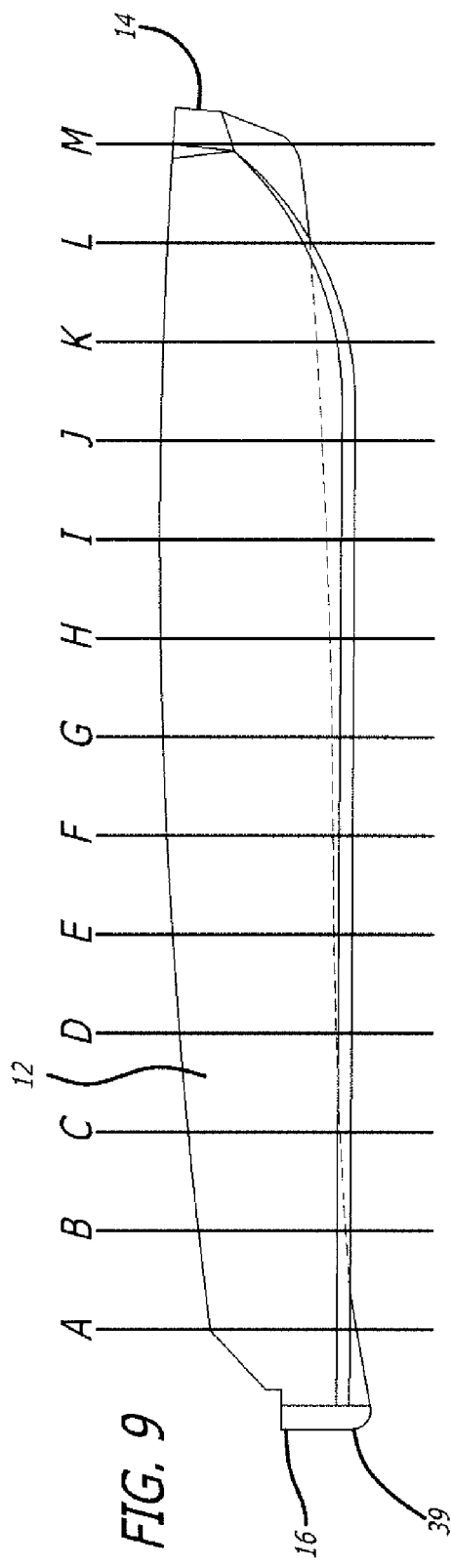
FIG. 9 is a side view of the hull, depicting locations of spaced cross-sectional cuts A-M at preselected locations along the length of the hull between the stern and bow of the hull, respectively.
Figure 10:
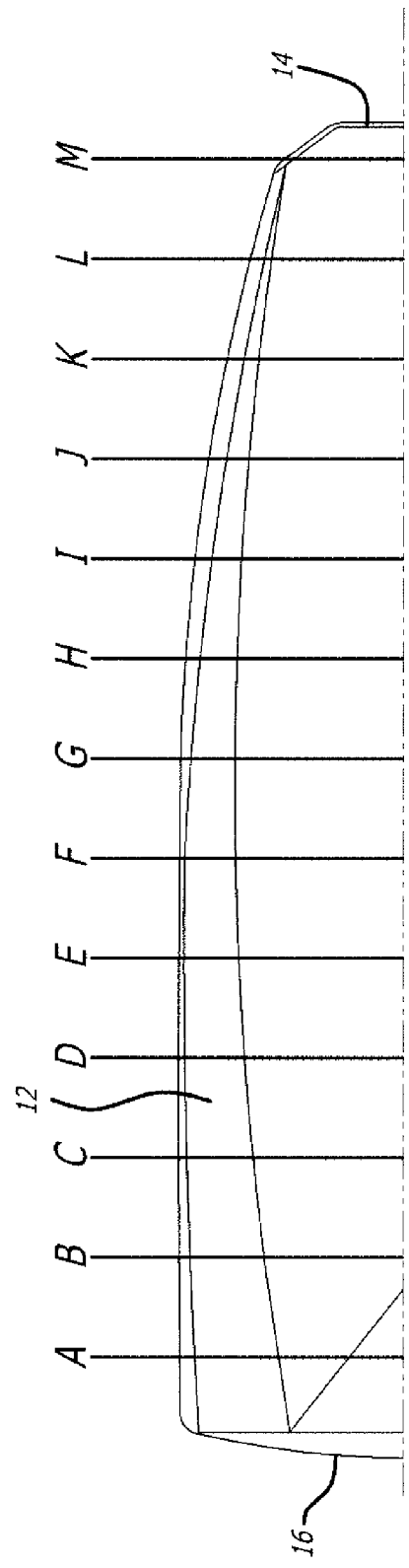
FIG. 10 is a bottom view of the half-hull, as used in naval architectural drawings, depicting the locations of spaced cross-sectional cuts shown in FIG. 9.

Referring to FIGS. 9 and 10, the hull 12 is depicted viewed from the side and from below, respectively, with a plurality of cross-sectional cut lines A-M. FIG. 11 depicts the hull in cross-section viewed from the bow 14, depicting all of the cross-sectional cut lines A-M. FIGS. 12A-12M depict separate cross-sections, viewed from the bow 14, of each of the cross-sectional cuts A-M. In FIGS. 12A-12M, the general flattening in depth of the central ridge 22, the port and starboard ridges 24 and 25, and the concave portions 26 and 27 between the bow 14 and the substantially planar hull portion 23. The emergence of the trim wedge 35 also can be seen. More significantly, FIGS. 12M, 12L, and 12K depict the configuration of the port and starboard concave portions 26 and 27 at the bow 14 (FIG. 12M) and proximate, but approximately 1.6 m aft of the bow (FIGS. 12K and 12L). The position of cross-sectional cuts K and L is approximately where the body of water through which the hull moves first touches the hull 12 when the hull operates in the dynamic surfing mode Mds, described in greater detail below. The cross-sectional configuration of the concave portions 26 and 27 proximate and immediately aft of the bow 14 is significant because, as will be explained below, this configuration reduces pressure loss at the bow 14, thereby suppressing entry of air, that would otherwise be trapped under the hull 12. Suppression of trapped air under the hull 12 subsequently suppresses turbulent flow of muddy-appearing water in the wake of the hull 12.

Figure 6:
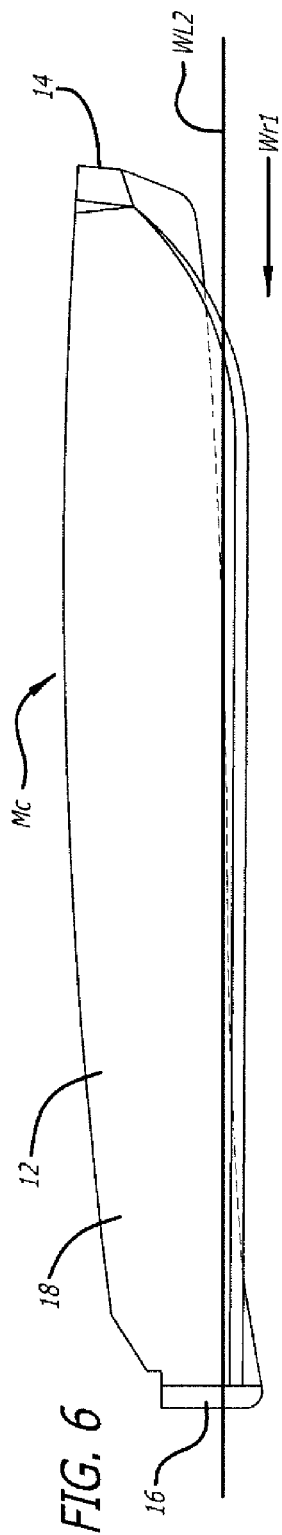
FIG. 6 is a side view of the hull in accordance with the invention, operating in the cruising mode.
Figure 7:
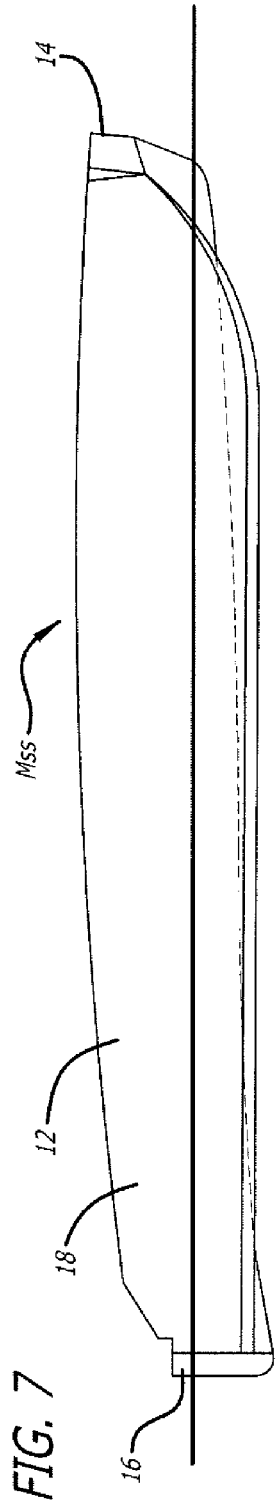
FIG. 7 is a side view of the hull in accordance with the invention, operating in the static surfing mode.

In accordance with the invention, selective flooding of selected ballast tanks with selected volumes of ballast water trim the hull in one of three operating modes. As broadly embodied in FIG. 6, hull 12 is depicted operating in a non-surfing, or cruising mode, Mc. As broadly depicted in FIG. 7, hull 12 is depicted operating in a static surfing mode, Mss. As broadly depicted in FIG. 8, hull 12 is depicted operating in a dynamic surfing mode, Msd. As embodied in FIG. 6, in the cruising mode, Mc, the hull 12 is moving through the body of water, the ballast tanks are substantially empty, the hull 12 displaces a first amount of displaced water, the hull is trimmed bow up, a second waterline WL2 is defined on the bulwarks, higher on the bulwarks than the first at-rest waterline WL1, a first amount of water enters the openings of the port and starboard concave portions 26 and 27, and traverses through the length of the concave portions 26 and 27, and the hull 12 encounters a first water resistance Wr1. As a result of all of the above factors, the hull 12 generates a first wake wave W1 having a first wave height Wh1, and a first wave shape Ws1. As broadly depicted in FIG. 7, the static surfing mode, Mss, the hull 12 is not moving through the water, the ballast tanks are partially filled, the hull displaces an amount of displaced water intermediate the amounts of displaced water in the cruising mode Mc and the dynamic surfing mode Msd, and the hull 12 has a stern down trim intermediate the trims in the cruising mode Mc and the dynamic surfing mode Msd.

Figure 8:
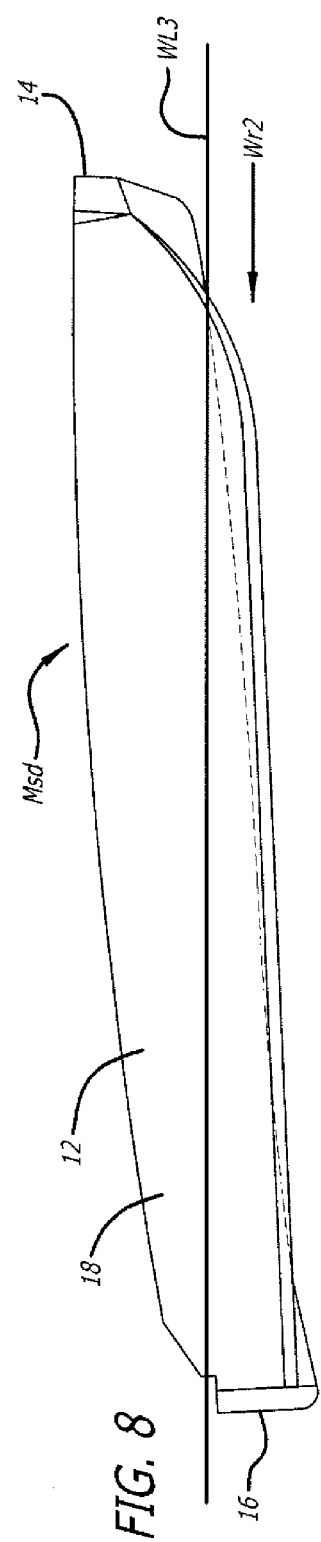
FIG. 8 is a side view of the hull in accordance with the invention, operating in the dynamic surfing mode.

As broadly embodied in FIG. 8, in the dynamic surfing mode, Msd, the hull again is moving through the body of water, the ballast tanks are substantially filled or filled, the hull 12 displaces a second amount of displaced water, greater than the first amount of displaced water, the hull 12 is trimmed stern down, a third waterline WL3 is defined on the bulwarks, higher on the bulwarks than the second waterline WL2, resulting in more surface of the hull being in contact with the body of water, a second amount of water, greater than the first amount of water, enters the openings of the concave portions 26 and 27 and traverses the lengths of the concave portions 26 and 27, and the hull 12 encounters a second amount of water resistance Wr2, greater than the first amount of water resistance Wr1 encountered in the cruising mode Mc. In the dynamic surfing mode Msd, the hull 12 generates a second wake wave W2. As a result of all of the above factors, a second wave height Wh2 of second wake wave W2 is greater than the wave height Wh1 of wake wave W1 generated in the cruising mode Mc.

Figure 18:
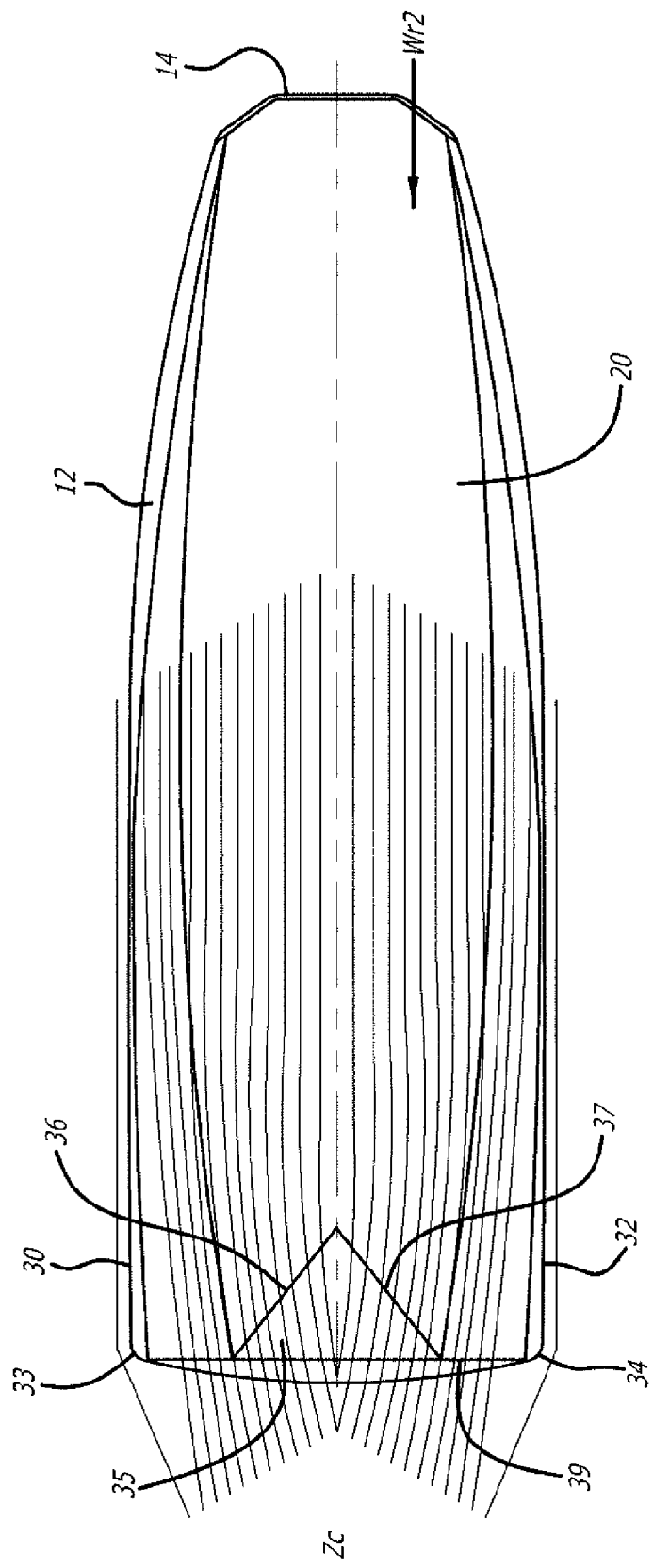
FIG. 18 depicts flow of water under the hull having the configuration in accordance with the invention as depicted in FIGS. 1-16, wherein the configuration of the bow acts substantially as a funnel, funneling water aft to where the trim wedge, the laterally-rounded sponsons, and the first and second stern rounded portions redirect the water to a convergent zone in the wake, to shape the wake wave as desired.

In accordance with the invention, wake wave W2 also has a different wave shape Ws2. As broadly depicted in FIGS. 14 and 18, rounding of the lateral sponsons 30 and 32 with the approximately 150 mm fillets 33 and 34 deflect portions of lateral flow of the body of water inward toward the wake of the hull 12. As broadly embodied in FIG. 15, the first stern rounded portion 38 immediately aft of the trim wedge 35 directs flow of the body of water beneath the hull upward toward the surface in the wake of the hull 12. The second rounded stern portion 39, assists the lateral rounded sponsons to direct water flowing past the bulwarks into the wake of the hull 12. Moreover, as broadly depicted in FIG. 18, water passing below the hull 12 is further directed by contact with triangular faces 36 and 37 of trim wedge 35 to a center of the wake. Each of the above factors contributes to water flowing laterally past, and below, the hull 12, being directed to a convergent zone Zc in the wake of the hull 12, which contributes to generation of the wave shape Ws2 with an improved face and crest, having reduced turbulence.

Furthermore, the increase in LWL, as a result of the above-described factors in the dynamic surfing mode Msd achieves improved performance and an increase in the wetted surface of the hull. As broadly embodied in FIG. 16, the configuration of the concave portions 26 and 27 proximate the bow 14 maintain higher pressure below the concave portions, thereby suppressing entry of air under the hull at the bow, subsequently maintaining desired high pressure areas 50 under the hull, as shown in FIG. 17.

Figure 17:
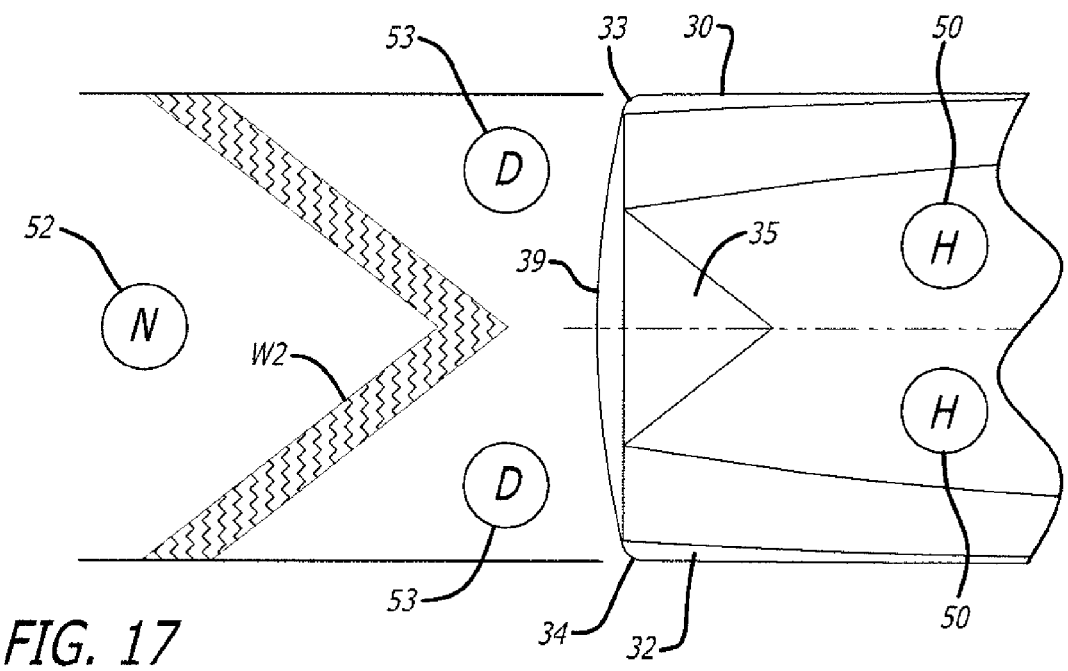
FIG. 17 depicts water pressure conditions beneath the hull and in the wake of the hull resulting from the configuration of the hull in accordance with the invention as depicted in FIGS.

In addition, as broadly embodied in FIG. 17, the wave created by the hull 12 passing, rather than planning, in the water is due to a reinstatement of normal atmospheric pressure 52 (1 bar at sea level) following disturbance in the water created by passage of the hull therethrough, wherein surface water is pushed downward, increasing pressure in the water, with atmospheric pressure following immediately after passage of the hull, which typically creates pressure fluctuations 53 which result in an unsatisfactory wave shape. The combined hull features discussed above act together to suppress pressure fluctuations 53 in the water. As broadly embodied in FIG. 18, the structural hull features, including the concave portions 26 ad 27, act as a funnel, carrying water back to where the trim wedge 35 and the rounded features proximate the stern 16, i.e. 33, 34, and 39, redirect water into the wake to convergent zone Zc, to generate the wake wave with a desired shape, in terms of aspect, slope, and power.

The wakesurfing boat further includes a deck, visible in FIG. 1, and a pair of counter-rotating propellers (not shown) to propel the boat.

One of ordinary skill in the art will understand that the configuration and principle of operation of the wakesurfing boat and the hull for a wakesurfing boat, in accordance with the present invention, is not limited to any length of hull. The hull 12 can have the length L of a yacht, the length L of a cruiser, or the length L of a sport boat.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A wakesurfing boat comprising:
   a hull comprising a bow, a stern, a center of gravity CG, a port bulwark, a starboard bulwark, a length L, a beam B, a first waterline defined on the bulwarks when the hull is at rest in a body of water, and a bottom extending for a preselected length from the bow to the stern, the bottom comprising:
   a substantially central ridge extending a first depth below the hull proximate the bow, the substantially central ridge extending along the length at progressively decreasing depths below the hull to a substantially planar bottom portion midway between the bow and the stern;
   port and starboard ridges extending second depths below the hull proximate the respective port and starboard bulwarks, defining with the substantially central ridge a generally M-shaped cross section, with port and starboard concave portions between the substantially central ridge and the respective port and starboard ridges, the port and starboard ridges extending at progressively decreasing depths below the hull to the substantially planar bottom portion; and
   port and starboard lateral sponsons extending beneath the port and starboard bulwarks proximate the stern; and
   a ballast system supported by the hull comprising a plurality of ballast tanks and a ballast watering system, the ballast tanks configured and positioned in the hull to selectively receive ballast water to trim the hull, while moving through the water, in one of at least two operating modes, the at least two operating modes including:

a cruising mode, wherein the ballast tanks are substantially empty, the hull has a first trim angle and a second waterline, the hull displacing a first amount of water, and a first amount of water entering openings at the bow of the port and starboard concave portions of the generally M-shaped bottom and traversing the length in the port and starboard concave portions, combining to subject the hull to a first amount of water resistance; and a dynamic surfing mode, wherein the ballast tanks are at least partially filled or filled with ballast water, the hull has a second trim angle and a third waterline, higher on the bulwarks than the second waterline, the hull displacing a second amount of displaced water greater than the first amount of displaced water, and a second amount of water, greater than the first amount of water, entering the openings at the bow of the port and starboard concave portions of the generally M-shaped bottom and traversing the length in the port and starboard concave portions, combining to subject the hull to a second amount of water resistance greater than the first amount of water resistance;

a deck; and at least one propeller.

2. The wakesurfing boat of claim 1, wherein a length to beam ratio (L/B) of the hull is less than 3.0.

3. The wakesurfing boat of claim 1, wherein the hull is configured such that when the hull is moving in the dynamic surfing mode, interference with flow of water below the bottom of the hull, directs the water beneath the hull to a convergent zone in the wake of the boat.

4. The wakesurfing boat of claim 1, further comprising a first generally rounded stern portion.

5. The wakesurfing boat of claim 4, further comprising a second generally rounded stern portion.

6. The wakesurfing boat of claim 1, wherein the ballast tanks comprise a plurality of sets of tanks, the sets of tanks being positioned at generally symmetrical locations with respect to one another on the hull.

7. The wakesurfing boat of claim 1, wherein when the hull moves through the body of water in the cruising mode, the hull generates at least one wake wave having a first height and a first shape.

8. The wakesurfing boat of claim 7, wherein when the hull moves through the body of water in the dynamic surfing mode, as a result of the increased ballast, the increased amount of displaced water, the second amount of water passing through the port and starboard concave portions of the generally M-shaped bottom, the second greater amount of water resistance to the hull, and the water passing past the lateral sponsons, the hull generates at least one wake wave having a second height that is greater than the first height, and a second shape.

9. A hull for a wakesurfing boat, the hull comprising:

a bow, a stern, a center of gravity CG, a port bulwark, a starboard bulwark, a length L, a beam B, a first waterline defined on the bulwarks when the hull is at rest in a body of water, and a bottom extending for a preselected length from the bow to the stern, the bottom comprising:

a substantially central ridge extending a first depth below the hull proximate the bow, the substantially central ridge extending along the length at progressively decreasing depths below the hull to a substantially planar bottom portion midway between the bow and the stern;

port and starboard ridges extending second depths below the hull proximate the respective port and starboard bulwarks, defining with the substantially central ridge a generally M-shaped cross section with port and starboard concave portions between the substantially central ridge and the port and starboard ridges, the port and starboard ridges extending at progressively decreasing depths below the first waterline to the substantially planar bottom portion; and port and starboard lateral sponsons extending beneath the port and starboard bulwarks proximate the stern; and a ballast system supported by the hull comprising a plurality of ballast tanks and a ballast watering system, the ballast tanks configured and positioned in the hull to selectively receive ballast water to trim the hull, while moving through the water, in one of at least two operating modes, the at least two operating modes including:

a cruising mode, wherein the ballast tanks are substantially empty, the hull has a first trim angle and a second waterline, the hull displacing a first amount of water, and a first amount of water entering openings at the bow of the port and starboard concave portions of the generally M-shaped bottom, and traversing the length in the port and starboard concave portions, combining to subject the hull to a first amount of water resistance; and a dynamic surfing mode, wherein the ballast tanks are at least partially filled or filled with ballast water, the hull has a second trim angle and a third waterline, higher on the bulwarks than the second waterline, the hull displacing a second amount of displaced water greater than the first amount of displaced water, and a second amount of water, greater than the first amount of water, entering the openings at the bow of the port and starboard concave portions of the generally M-shaped bottom, and traversing the length in the port and starboard concave portions, combining to subject the hull to a second amount of water resistance greater than the first amount of water resistance.

10. The hull of claim 9, wherein a length to beam ratio (L/B) of the hull is less than 3.0.

11. The hull of claim 9, wherein when the bottom is configured such that when the hull is moving in the dynamic surfing mode, interference with flow of water below the bottom of the hull directs the water beneath the hull to a converging zone in the wake of the hull.

12. The hull of claim 9, further comprising a first generally rounded stern portion.

13. The hull of claim 12, further comprising a second generally rounded stern portion.

14. The hull of claim 12, wherein when the hull moves through the body of water in the cruising mode, the hull generates at least one wake wave having a first height and a first shape.

15. The hull of claim 14, wherein when the hull moves through the body of water in the dynamic surfing mode, as a result of the increased ballast, the increased amount of displaced water, the second amount of water passing through the port and starboard concave portions of the generally M-shaped bottom, the second greater amount of water resistance to the hull, and the water passing past the sponsons, the hull generates at least one wake wave having a second height that is greater than the first height, and a second shape.

16. The hull of claim 9, wherein the length L is a length selected from the group consisting of the length of a yacht, the length of a cruiser, and the length of a sport boat.

17. The hull of claim 9, wherein the port and starboard concave portions are configured to at least partially prevent air from entering under the bow.

18. The wakesurfing boat of claim 1, wherein the length L is a length selected from the group consisting of the length of a yacht, the length of a cruiser, and the length of a sport boat.

19. A hull for a wakesurfing boat, the hull comprising:
- a bow, a stern, a center of gravity CG, a port bulwark, a starboard bulwark, a length L, a beam B, a first waterline defined on the bulwarks when the hull is at rest in a body of water, and a bottom extending for a preselected length from the bow to the stern, the bottom comprising:
- a substantially central ridge extending a first depth below the hull proximate the bow, the substantially central ridge extending along the length at progressively decreasing depths below the hull to a substantially planar bottom portion midway between the bow and the stern;
- port and starboard ridges extending second depths below the hull proximate the respective port and starboard bulwarks, defining with the substantially central ridge a generally M-shaped cross section with port and starboard concave portions between the substantially central ridge and the port and starboard ridges, the port and starboard ridges extending at progressively decreasing depths below the hull to the substantially planar bottom portion;
- a trim wedge extending below the stern, and extending forward toward the substantially planar portion;
- a first rounded stern portion fixed to the trim wedge aft of the trim wedge;
- a second rounded stern portion; and
- a ballast system supported by the hull comprising a plurality of ballast tanks and a ballast watering system, the ballast tanks configured and positioned in the hull to selectively receive ballast water to trim the hull, while moving through the water, in one of at least two operating modes, the at least two operating modes including:
- a cruising mode, wherein the ballast tanks are substantially empty, the hull has a first trim angle and a second waterline, the hull displacing a first amount of water, and a first amount of water entering openings at the bow of the port and starboard concave portions of the generally M-shaped bottom, and traversing the length in the port and starboard concave portions, combining to subject the hull to a first amount of water resistance;
- wherein the port and starboard concave portions are configured to at least partially prevent air from entering under the bow; and
- a dynamic surfing mode, wherein the ballast tanks are at least partially filled or filled with ballast water, the hull has a second trim angle and a third waterline, higher on the bulwarks than the second waterline, the hull displacing a second amount of displaced water greater than the first amount of displaced water, and a second amount of water, greater than the first amount of water, entering the openings at the bow of the port and starboard concave portions of the generally M-shaped bottom, and traversing the length in the port and starboard concave portions, combining to subject the hull to a second amount of water resistance greater than the first amount of water resistance; and
- wherein the trim wedge, and the first and second stern rounded portions, are each configured to direct water into a convergent zone in the wake of the hull.

20. A wakesurfing boat comprising:
- a hull comprising a bow, a stern, a center of gravity CG, a port bulwark, a starboard bulwark, a length L, a beam B, a first waterline defined on the bulwarks when the hull is at rest in a body of water, and a bottom extending for a preselected length from the bow to the stern, the bottom comprising:
- a substantially central ridge extending a first depth below the hull proximate the bow, the substantially central ridge extending along the length at progressively decreasing depths below the hull to a substantially planar bottom portion midway between the bow and the stern;
- port and starboard ridges extending second depths below the hull proximate the respective port and starboard bulwarks, defining with the substantially central ridge a generally M-shaped cross-section, with port and starboard concave portions between these substantially central ridge and of the respective port and starboard ridges, the port and starboard ridges extending at progressively decreasing depths below the hull to the substantially planar bottom portion; and
- a trim wedge extending below the stern, and extending forward toward the substantially planar portion;
- a ballast system supported by the hull comprising a plurality of ballast tanks and a ballast watering system, the ballast tanks configured and positioned in the hull to selectively received ballast water to trim the hull, while moving through the water, in one of at least two operating modes, the at least two operating modes including:
- a cruising mode, wherein the ballast tanks are substantially empty the hull has a first trim angle and a second waterline, the hull displacing a first amount of displaced water, and a first amount of surface water entering openings at the bow of the port and starboard concave portions of the generally M-shaped bottom and traversing the length in the port and starboard concave portions, combining to subject the hull to a first amount of water resistance; and
- a dynamic surfing mode, wherein the ballast tanks are at least partially filled or filled with ballast water, the hull has a second trim angle and a second waterline higher on the bulwarks than the first waterline, the hull displacing a second amount of displaced water greater than the first amount of displaced water, and a second amount of surface water, greater than the first amount of surface water, entering the openings at the bow of the port and starboard concave portions of the generally M-shaped bottom and traversing the length in the port and starboard concave portions, combining to subject the hull to a second amount of water resistance, greater than the first amount of water resistance;
- a deck; and
- at least one propeller.

21. A wakesurfing boat comprising:
- a hull comprising a bow, a stern, a center of gravity CG, a port bulwark, a starboard bulwark, a length L, a beam B, a first waterline defined on the bulwarks when the hull is at rest in a body of water, and a bottom extending for a preselected length from the bow to the stern, the bottom comprising:
- a substantially central ridge extending a first depth below the hull proximate the bow, the substantially central ridge extending along the length at progressively decreasing depths below the hull to a substantially planar bottom portion midway between the bow and the stern; and
- port and starboard ridges proximate the respective port and starboard bulwarks, defining with the substantially central ridge a generally M-shaped cross-section, with port and starboard concave portions between these substantially central ridge and of the respective port and starboard ridges, the port and starboard ridges extending at progressively decreasing depths below the hull;

a ballast system supported by the hull comprising a plurality of ballast tanks and a ballast watering system, the ballast tanks configured and positioned in the hull to selectively received ballast water to trim the hull, while moving through the water, in one of at least two operating modes, the at least two operating modes including:

a cruising mode, wherein the ballast tanks are substantially empty the hull has a first trim angle and a second waterline, the hull displacing a first amount of displaced water, and a first amount of surface water entering openings at the bow of the port and starboard concave portions of the generally M-shaped bottom and traversing the length in the port and starboard concave portions, combining to subject the hull to a first amount of water resistance; and a dynamic surfing mode, wherein the ballast tanks are at least partially filled or filled with ballast water, the hull has a second trim angle and a second waterline higher on the bulwarks than the first waterline, the hull displacing a second amount of displaced water greater than the first amount of displaced water, and a second amount of surface water, greater than the first amount of surface water, entering the openings at the bow of the port and starboard concave portions of the generally M-shaped bottom and traversing the length in the port and starboard concave portions, combining to subject the hull to a second amount of water resistance, greater than the first amount of water resistance;

a deck; and at least one propeller;

wherein the M-shaped bottom is configured to direct water beneath the hull to a convergent zone in the wake of the hull.

22. The wakesurfing boat of claim 21, wherein the M-shaped hull is further configured to at least partially prevent air from entering under the bow.

23. A hull for a wakesurfing boat, the hull comprising:

a bow, a stern, a center of gravity CG, a port bulwark, a starboard bulwark, a length L, a beam B, a first waterline defined on the bulwarks when the hull is at rest in a body of water, and a bottom extending for a preselected length from the bow to the stern, the bottom comprising:

a substantially central ridge extending a first depth below the hull proximate the bow, the substantially central ridge extending along the length at progressively decreasing depths below the hull to a substantially planar bottom portion midway between the bow and the stern;

port and starboard ridges extending second depths below the hull proximate the respective port and starboard bulwarks, defining with the substantially central ridge a generally M-shaped cross section with port and starboard concave portions between the substantially central ridge and the port and starboard ridges, the port and starboard ridges extending at progressively decreasing depths below the hull; and a ballast system supported by the hull comprising a plurality of ballast tanks and a ballast watering system, the ballast tanks configured and positioned in the hull to selectively receive ballast water to trim the hull, while moving through the water, in one of at least two operating modes, the at least two operating modes including:

a cruising mode, wherein the ballast tanks are substantially empty, the hull has a first trim angle and a second waterline, the hull displacing a first amount of water, and a first amount of water entering openings at the bow of the port and starboard concave portions of the generally M-shaped bottom, and traversing the length in the port and starboard concave portions, combining to subject the hull to a first amount of water resistance; and a dynamic surfing mode, wherein the ballast tanks are at least partially filled or filled with ballast water, the hull has a second trim angle and a second waterline, higher on the bulwarks than the first waterline, the hull displacing a second amount of displaced water greater than the first amount of displaced water, and a second amount of surface water, greater than the first amount of surface water, entering the openings at the bow of the port and starboard concave portions of the generally M-shaped bottom, and traversing the length in the port and starboard concave portions, combining to subject the hull to a second amount of water resistance greater than the first amount of water resistance;

wherein the M-shaped bottom is configured to direct water into a convergent zone in the wake of the hull.

24. The hull of claim 23, wherein the M-shaped bottom is further configured to at least partially prevent air from entering under the bow.

25. A method of generating a wakesurfing wave, comprising:

utilizing a wakesurfing boat, the boat comprising:

a hull comprising a bow, a stern, a center of gravity CG, a port bulwark, a starboard bulwark, a length L, a beam B, a first waterline defined on the bulwarks when the hull is at rest in a body of water, and a bottom extending for a preselected length from the bow to the stern, the bottom comprising:

a substantially central ridge extending a first depth below the hull proximate the bow, the substantially central ridge extending along the length at progressively decreasing depths below the hull to a substantially planar bottom portion midway between the bow and the stern;

port and starboard ridges extending second depths below the hull proximate the respective port and starboard bulwarks, defining with the substantially central ridge a generally M-shaped cross section, with port and starboard concave portions between the substantially central ridge and the respective port and starboard ridges, the port and starboard ridges extending at progressively decreasing depths below the hull to the substantially planar bottom portion;

port and starboard lateral sponsons extending beneath the port and starboard bulwarks proximate the stern; and a trim wedge extending below the stern, and extending forward toward the substantially planar portion;

a ballast system supported by the hull comprising a plurality of ballast tanks and a ballast watering system, the ballast tanks configured and positioned in the hull to selectively receive ballast water to trim the hull, while moving through the water, in one of at least two operating modes, the at least two operating modes including:

a cruising mode, wherein the ballast tanks are substantially empty, the hull has a first trim angle and a second waterline, the hull displacing a first amount of water, and a first amount of water entering openings at the bow of the port and starboard concave portions of the generally M-shaped bottom and traversing the length in the port and starboard concave portions, combining to subject the hull to a first amount of water resistance, generating a first wake wave; and a dynamic surfing mode, wherein the ballast tanks are at least partially filled or filled with ballast water, the hull has a second trim angle and a third waterline, higher on the bulwarks than the second waterline, the hull displacing a second amount of displaced water greater than the first amount of displaced water, and a second amount of water, greater than the first amount of water, entering the openings at the bow of the port and starboard concave portions of the generally M-shaped bottom and traversing the length in the port and starboard concave portions, combining to subject the hull to a second amount of water resistance greater than the first amount of water resistance;

a deck; and at least one propeller;

wherein the generally M-shaped bottom, the lateral sponsons and the trim wedge direct water beneath the hull to a convergent zone in the wake of the hull which, combined with the increased second amount of displaced water and the increased second amount of water resistance, generate a second wake wave larger than the first wake wave; and operating the boat in the dynamic surfing mode.

26. A method of generating a wakesurfing wave, comprising:

utilizing a wakesurfing boat, the boat comprising:

a hull comprising a bow, a stern, a center of gravity CG, a port bulwark, a starboard bulwark, a length L, a beam B, a first waterline defined on the bulwarks when the hull is at rest in a body of water, and a bottom extending for a preselected length from the bow to the stern, the bottom comprising:

a substantially central ridge extending a first depth below the hull proximate the bow, the substantially central ridge extending along the length at progressively decreasing depths below the hull to a substantially planar bottom portion midway between the bow and the stern;

port and starboard ridges extending second depths below the hull proximate the respective port and starboard bulwarks, defining with the substantially central ridge a generally M-shaped cross section, with port and starboard concave portions between the substantially central ridge and the respective port and starboard ridges, the port and starboard ridges extending at progressively decreasing depths below the hull to the substantially planar bottom portion;

port and starboard lateral sponsons extending beneath the port and starboard bulwarks proximate the stern; and a ballast system supported by the hull comprising a plurality of ballast tanks and a ballast watering system, the ballast tanks configured and positioned in the hull to selectively receive ballast water to trim the hull, while moving through the water, in one of at least two operating modes, the at least two operating modes including:

a cruising mode, wherein the ballast tanks are substantially empty, the hull has a first trim angle and a second waterline, the hull displacing a first amount of water, and a first amount of water entering openings at the bow of the port and starboard concave portions of the generally M-shaped bottom and traversing the length in the port and starboard concave portions, combining to subject the hull to a first amount of water resistance, generating a first wake wave; and a dynamic surfing mode, wherein the ballast tanks are at least partially filled or filled with ballast water, the hull has a second trim angle and a third waterline, higher on the bulwarks than the second waterline, the hull displacing a second amount of displaced water greater than the first amount of displaced water, and a second amount of water, greater than the first amount of water, entering the openings at the bow of the port and starboard concave portions of the generally M-shaped bottom and traversing the length in the port and starboard concave portions, combining to subject the hull to a second amount of water resistance greater than the first amount of water resistance;

a deck; and at least one propeller;

wherein the generally M-shaped bottom, and the lateral sponsons direct water beneath the hull to a convergent zone in the wake of the hull which, combined with the increased second amount of displaced water and the increased second amount of water resistance, generate a second wake wave larger than the first wake wave; and operating the boat in the dynamic surfing mode.

27. A method of generating a wakesurfing wave, comprising:

utilizing a wakesurfing boat, the boat comprising:

a hull comprising a bow, a stern, a center of gravity CG, a port bulwark, a starboard bulwark, a length L, a beam B, a first waterline defined on the bulwarks when the hull is at rest in a body of water, and a bottom extending for a preselected length from the bow to the stern, the bottom comprising:

a substantially central ridge extending a first depth below the hull proximate the bow, the substantially central ridge extending along the length at progressively decreasing depths below the hull to a substantially planar bottom portion midway between the bow and the stern;

port and starboard ridges extending second depths below the hull proximate the respective port and starboard bulwarks, defining with the substantially central ridge a generally M-shaped cross section, with port and starboard concave portions between the substantially central ridge and the respective port and starboard ridges, the port and starboard ridges extending at progressively decreasing depths below the hull to the substantially planar bottom portion; and a trim wedge extending below the stern, and extending forward toward the substantially planar portion;

a ballast system supported by the hull comprising a plurality of ballast tanks and a ballast watering system, the ballast tanks configured and positioned in the hull to selectively receive ballast water to trim the hull, while moving through the water, in one of at least two operating modes, the at least two operating modes including:

a cruising mode, wherein the ballast tanks are substantially empty, the hull has a first trim angle and a second waterline, the hull displacing a first amount of water, and a first amount of water entering openings at the bow of the port and starboard concave portions of the generally M-shaped bottom and traversing the length in the port and starboard concave portions, combining to subject the hull to a first amount of water resistance, generating a first wake wave; and a dynamic surfing mode, wherein the ballast tanks are at least partially filled or filled with ballast water, the hull has a second trim angle and a third waterline, higher on the bulwarks than the second waterline, the hull displacing a second amount of displaced water greater than the first amount of displaced water, and a second amount of water, greater than the first amount of water, entering the openings at the bow of the port and starboard concave portions of the generally M-shaped bottom and traversing the length in the port and starboard concave portions, combining to subject the hull to a second amount of water resistance greater than the first amount of water resistance;

a deck; and at least one propeller;

wherein the generally M-shaped bottom, and the trim wedge direct water beneath the hull to a convergent zone in the wake of the hull which, combined with the increased second amount of displaced water and the increased second amount of water resistance, generate a second wake wave larger than the first wake wave; and operating the boat in the dynamic surfing mode.

28. A method of generating a wakesurfing wave, comprising:

utilizing a wakesurfing boat, the boat comprising:

a hull comprising a bow, a stern, a center of gravity CG, a port bulwark, a starboard bulwark, a length L, a beam B, a first waterline defined on the bulwarks when the hull is at rest in a body of water, and a bottom extending for a preselected length from the bow to the stern, the bottom comprising:

a substantially central ridge extending a first depth below the hull proximate the bow, the substantially central ridge extending along the length at progressively decreasing depths below the hull to a substantially planar bottom portion midway between the bow and the stern;

port and starboard ridges extending second depths below the hull proximate the respective port and starboard bulwarks, defining with the substantially central ridge a generally M-shaped cross section, with port and starboard concave portions between the substantially central ridge and the respective port and starboard ridges, the port and starboard ridges extending at progressively decreasing depths below the hull; and a ballast system supported by the hull comprising a plurality of ballast tanks and a ballast watering system, the ballast tanks configured and positioned in the hull to selectively receive ballast water to trim the hull, while moving through the water, in one of at least two operating modes, the at least two operating modes including:

a cruising mode, wherein the ballast tanks are substantially empty, the hull has a first trim angle and a second waterline, the hull displacing a first amount of water, and a first amount of water entering openings at the bow of the port and starboard concave portions of the generally M-shaped bottom and traversing the length in the port and starboard concave portions, combining to subject the hull to a first amount of water resistance, generating a first wake wave; and a dynamic surfing mode, wherein the ballast tanks are at least partially filled or filled with ballast water, the hull has a second trim angle and a third waterline, higher on the bulwarks than the second waterline, the hull displacing a second amount of displaced water greater than the first amount of displaced water, and a second amount of water, greater than the first amount of water, entering the openings at the bow of the port and starboard concave portions of the generally M-shaped bottom and traversing the length in the port and starboard concave portions, combining to subject the hull to a second amount of water resistance greater than the first amount of water resistance;

a deck; and at least one propeller;

wherein the generally M-shaped bottom, and the trim wedge direct water beneath the hull to a convergent zone in the wake of the hull which, combined with the increased second amount of displaced water and the increased second amount of water resistance, generate a second wake wave larger than the first wake wave; and operating the boat in the dynamic surfing mode.

* * * * *